March 1, 1932. F. E. FREY 1,847,240
PROCESS FOR POLYMERIZING GASEOUS HYDROCARBONS INTO VOLATILE LIQUIDS
Filed June 6, 1930
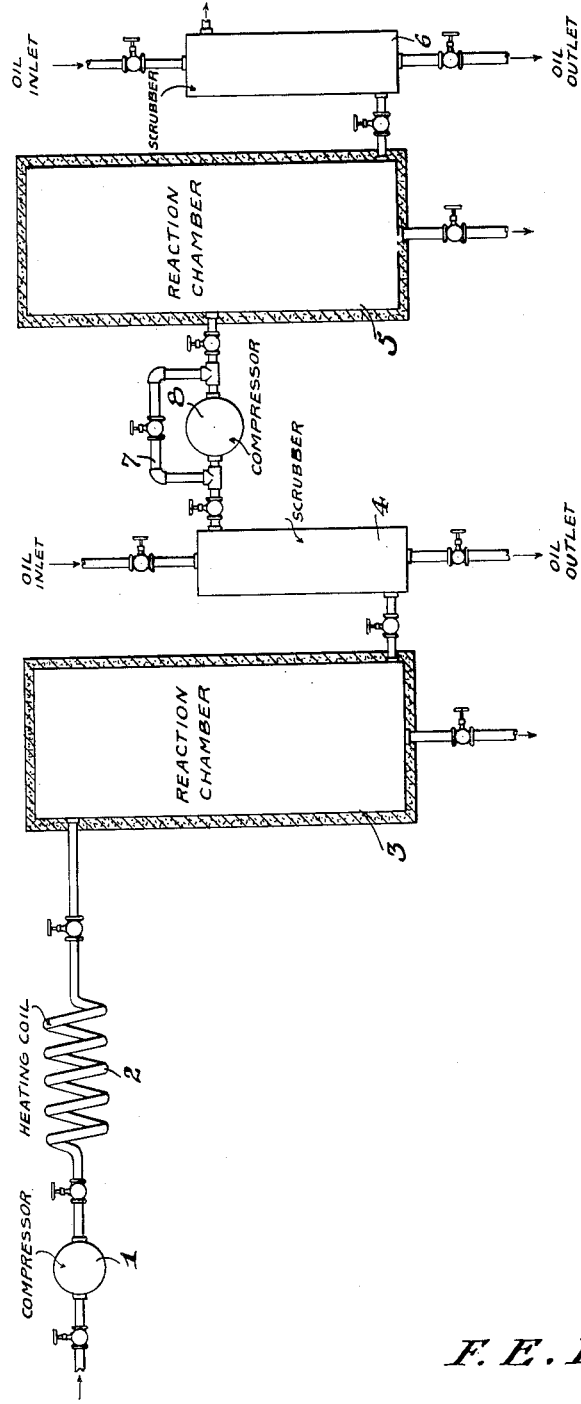
Inventor
F. E. Frey
By Robt. E. Barry
Attorney Patented Mar. 1, 1932

1,847,240

UNITED STATES PATENT OFFICE

FREDERICK E. FREY, OF BARTLESVILLE, OKLAHOMA, ASSIGNOR TO PHILLIPS PETROLEUM COMPANY, OF BARTLESVILLE, OKLAHOMA, A CORPORATION OF DELAWARE

PROCESS FOR POLYMERIZING GASEOUS HYDROCARBONS INTO VOLATILE LIQUIDS

Application filed June 6, 1930. Serial No. 459,588.

This invention relates to a process of converting gases and vapors into low boiling point liquid polymers by the application of heat to such gases while under suitable pressures.

One object of the invention is to bring about the polymerizing reaction so as to result in a conversion of a high percentage of the gases into low boiling point oils adapted for use as motor fuels.

Another object is to avoid the formation of fixed gases, such as methane, or diolefines, which tend to become converted into gums.

Another object is to carry out such a polymerization reaction in two or more stages with intermediate heat control, and, if desired, variable pressures in different stages.

Other objects and advantages of the invention will appear as the description proceeds.

The single figure of the drawing is a diagram of apparatus that may be used to carry out the process of this invention, but the apparatus indicated is only illustrative, and can be varied by those acquainted with the resources of the art.

It has been known for some time that liquid polymers can be formed from gaseous olefines by heating under compression. A suitable process designed to accomplish the formation of these liquids, with the application of a minimum amount of heat at close temperature control and preferably divided into time stages, with the removal of results of the reaction is described as follows:

The most suitable gases to use to be converted into burning oils by a polymerization reaction are those such as the olefins, viz: ethylene and its homologues. Since the paraffins do not form polymers they are excluded, but gases resulting from the cracking operations on petroleum compounds, containing, preferably over 25% of olefins are available for use as the raw material of this process.

To adapt certain gaseous hydrocarbons, appearing as by-products of various refining operations, to successful treatment the percentage of olefins present may be raised by the addition of concentrates of gaseous hydrocarbons, high in olefins, such as can be obtained by the use of well known fractionating apparatus.

The control of the process is furthermore facilitated by recognizing and utilizing the well known chemical and physical characteristics of the bodies under treatment, for instance, the well known property of ethylene to enter directly into combination with a great variety of substances, and, if in a particular treatment, the reaction should take place with a shortage of the even more reactive higher olefins, it may be accelerated by introducing a small proportion of them to promote the reaction of the ethylene present.

The gases to be treated in this process are passed from a compressor 1, into a tube coil 2, where they are rapidly brought up to a temperature suitable to set up a polymerization reaction at the given pressure determined by the compressor. This reaction takes place in a heat insulated chamber 3. Since the formation of the liquid polymers results from an exothermic reaction, no heat need be supplied the reaction chamber 3, when the gases are of the right nature to promote the progress of the reaction, which takes place especially freely when ethylene predominates, and when near the upper limits of the temperature and concentration found to be advisable to practice in the process.

Pressures of from 500 to 2000 pounds per square inch may be used, and temperatures from 700 to 1000 degrees F. As an instance of what the process will accomplish a gas containing chiefly ethylene was converted to the extent of 60% into oils boiling within the gasoline range by reacting at 500 lbs. pressure and 932 degrees F.

The yield of oils may be increased by conducting the reaction in two or more stages, each stage under such superatmospheric pressures and corresponding temperatures as have been indicated, and preferably conducted that the maximum yield possible of oil is not developed in the first reaction stage before it is interrupted, and a new stage commenced. This procedure, of course, distinguishes from a simple retreatment. The polymerization reaction in any event is preferably interrupted before any considerable amounts of oils boiling above the gasoline range have been formed, except in the last stage, where a maximum yield of oils may be allowed to develop.

The highest boiling point fraction desired of the polymers, which will boil principally in the gasoline range, is extracted by running off into a scrubber 4, and the gas freed from these heavier oils is subjected to one or more further polymerization steps, each in a reaction chamber 5, and each polymerization step is followed by an extraction of the highest boiling oils in a scrubber 6. Higher temperatures may be used for the successive treatments, and also different pressures. The temperature differences can be determined by feeding heated scrubber oil at suitable pressure to the scrubber element, and the pressure of the next stage varied by means of a compressor 8, which is provided with suitable valved connections 7 to afford a by-pass path.

Each polymerization step is kept under careful control of time, temperature and pressure, which may be varied from step to step as explained above, or simply repeated, as to some or all of the conditions to effect the maximum possible final yield of products sought. Obviously, the effluents of each stage may be mixed among their own grades to furnish a more uniform final product. Gaseous olefins removed from the exit gases of any stage may be added to the mixture of gases treated later.

Generally speaking, the most favorable temperatures of control of the polymerization reaction have been found to be below 950° F., but, dependent upon the density and boiling point of the polymer desired, this temperatures may be exceeded. The invention is not restricted to the extraction of oils boiling in the gasoline range.

As indicating the results of the stage by stage operation of polymerization in an instance of the application of that form of the process, an exposure of ethylene at 1000 lbs. per square inch for 5 minutes at a temperature of 840 degrees F. followed by a second exposure of 10 minutes at 840 degrees, after intermediate extraction of the higher boiling part of the oils, formed in the first stage, by scrubbing while under that pressure resulted in a total yield of 70% of oils boiling in the gasoline range, with a very little boiling above that range and practically no carbon.

The process may be modified with advantage in some operations by using scrubber oil heated to approximately the temperature of polymerization but preferably below 850° F., and introduced as a scrubbing step in the extraction, and this oil, prior to introduction may be used to absorb olefinic gases, thus serving two purposes. While going through the scrubber it would be under the pressure of the system, at the particular stage.

While, as stated above, under optimum conditions of correct temperature and pressure, acting on suitable hydrocarbon gases, the polymerization reaction is sufficiently exothermic to proceed without the addition of heat to the reaction chamber, conditions in some applications of the process may make it advisable to supply a small quantity of heat at some stages of the reaction, enough to keep it at an isothermal level. This additional heat can be supplied directly to the chamber itself, or in case a scrubbing step is used, the scrub oil can be superheated with respect to the temperature of the polymerization reaction.

What is claimed as novel is:

1. In a process for obtaining low boiling point hydrocarbon liquid polymers predominantly of the motor fuel range from olefinic hydrocarbon gases, continuously compressing said gases to a pressure between 500 and 2000 pounds per square inch, subsequently passing said gases under such pressure through an elongated passageway of restricted cross sectional area while heating the gases therein to a temperature sufficient to initiate polymerization of said gases, then passing said gases through an enlarged zone under said pressure and at slower velocity while maintaining the gases in said zone for a period of time sufficient to obtain an exothermic reaction and at temperatures between 700 and 1000° F. without introducing any extraneous heat into the zone, and then separating low boiling point liquid polymers so produced.

2. In a process for the conversion of olefine hydrocarbon bodies to low boiling hydrocarbons in the motor fuel range, heating olefine bearing gases to a temperature between 700 and 1000° F. at a pressure between 500 and 2000 pounds per square inch, then subjecting the gases containing the olefinic bodies to a treatment within said temperature and pressure range, said treatment being controlled as to exposure time so as to permit the formation of a minimum amount of higher boiling hydrocarbons, removing polymers from the resulting mixture by absorbing the said polymers in heavy oil at a temperature approximating the temperature of the olefinic gases under treatment, subjecting the remainder of the resulting gases to a second treatment within said temperature and pressure range, the second treatment being controlled as to exposure time so as to permit an optimum yield of low boiling hydrocarbons, and finally separating said low boiling hydrocarbons from the resulting mixture.

In testimony whereof, I hereto affix my signature.

FREDERICK E. FREY.

DISCLAIMER 1,847,240.—*Frederick E. Frey*, Bartlesville, Okla. PROCESS FOR POLYMERIZING GASEOUS HYDROCARBONS INTO VOLATILE LIQUIDS. Patent dated March 1, 1932. Disclaimer filed August 10, 1938, by the assignee, *Phillips Petroleum Company*.

Hereby enters this disclaimer to the subject matter of claim 1 of said Letters Patent, except as said claim applies to a process in which the olefinic hydrocarbon gases are heated in the elongated passageway to a temperature sufficient only to initiate polymerization, and in which the polymerization takes place in an enlarged insulated reaction zone without addition of heat to said zone or abstraction of heat therefrom.

[*Official Gazette September 6, 1938.*]